United States Patent [19]

Liston

[11] 3,745,349

[45] July 10, 1973

[54] SINGLE PATH, DUAL SOURCE RADIANT ENERGY ANALYZER

[76] Inventor: Max David Liston, 4121 Seton Road, Irvine, Calif. 92664

[22] Filed: Nov. 18, 1971

[21] Appl. No.: 199,889

[52] U.S. Cl............. 250/218, 250/43.5, 250/83.3 H
[51] Int. Cl. ............................................ G01n 21/26
[58] Field of Search................. 250/217, 43.5, 226, 250/205, 218, 83.3 H

[56] References Cited
UNITED STATES PATENTS

| | | | |
|---|---|---|---|
| 2,924,713 | 2/1960 | Liston............................... | 250/43.5 |
| 2,957,076 | 10/1960 | Francis............................. | 250/43.5 |
| 3,281,597 | 10/1966 | Greenberg........................ | 250/43.5 |
| 3,130,302 | 4/1964 | Liston et al....................... | 250/43.5 |
| 3,143,655 | 8/1964 | Strandberg...................... | 250/205 X |

*Primary Examiner*—Walter Stolwein
*Attorney*—Raymond L. Madsen et al.

[57] ABSTRACT

There is disclosed a radiant energy analyzer having a primary and secondary source of radiant energy which energy traverses a partially coincident path to a radiant energy detector. The primary source issues a radiant energy spectrum which is coincident at least in part with the absorption spectrum of a substance being analyzed. The secondary source generates a reference spectrum of radiant energy to which the spectrum from the primary source is compared in the radiant energy detector. The sources are alternately activated to provide a sample or measurement condition and a reference condition for analysis. The primary source is always directed through a container which confines the substance being analyzed and finally to the detector. The secondary source may be interposed between the container and the primary source, between the container and the detector or optically combined in parallel with the primary source depending upon the secondary source's spectrum of radiation and the analyzer application. A feedback loop is provided from the detector to at least one of the sources to control the radiant energy therefrom whereby the measurement and reference conditions are maintained balanced.

10 Claims, 4 Drawing Figures

Patented July 10, 1973
3,745,349
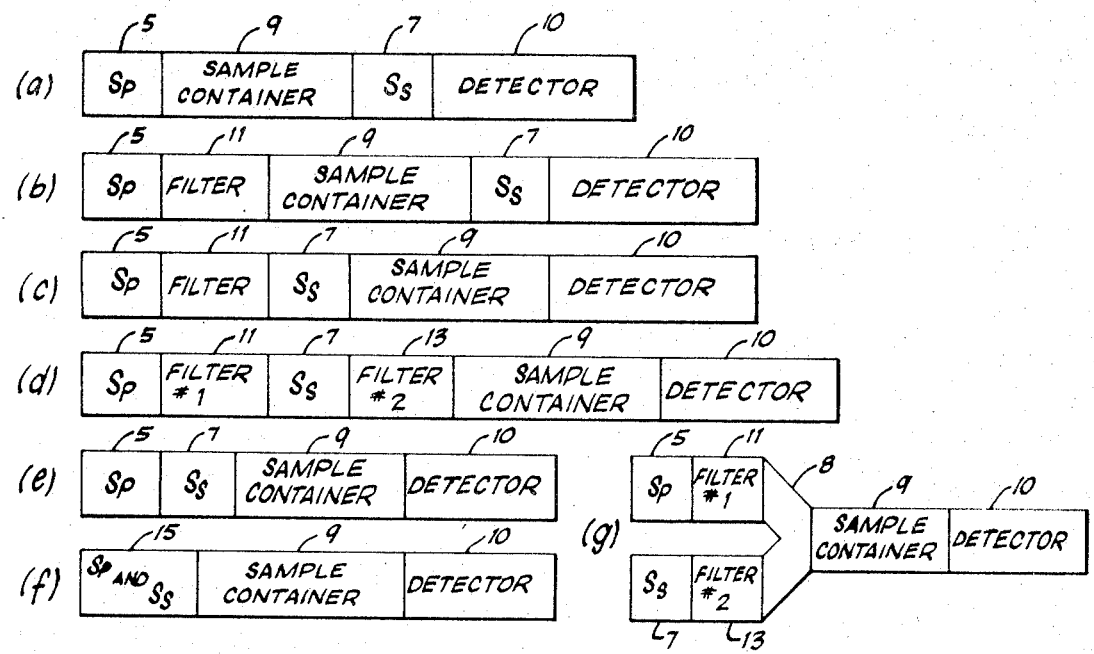
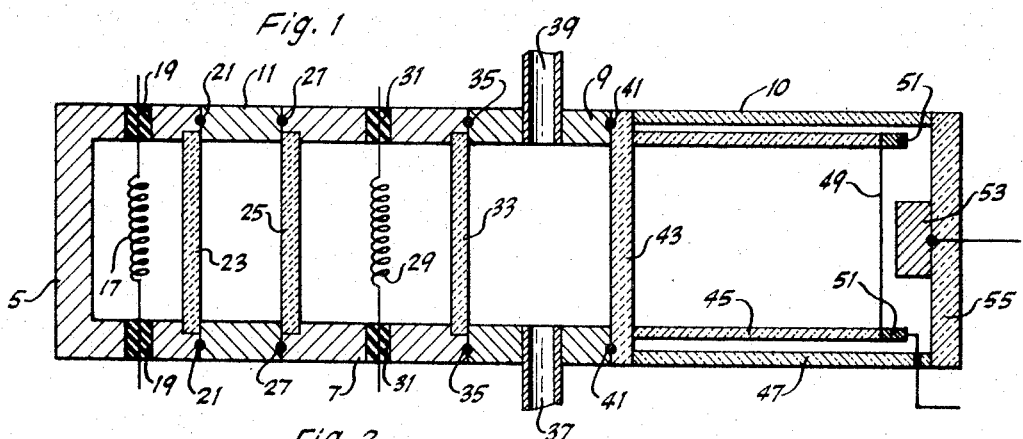
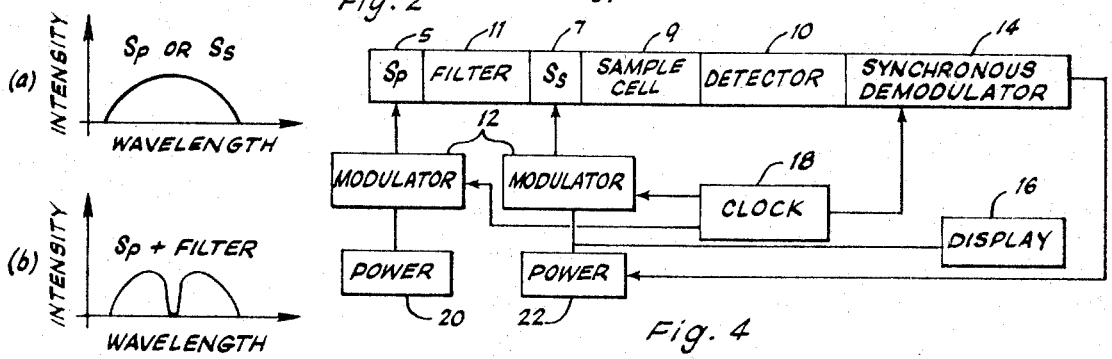
INVENTOR.
MAX D. LISTON
BY
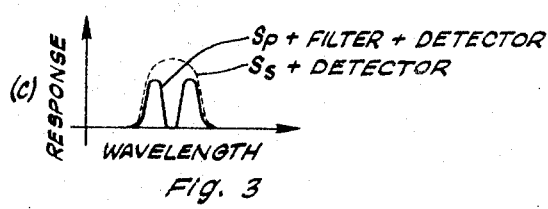
ATTORNEY

SINGLE PATH, DUAL SOURCE RADIANT ENERGY ANALYZER

The present invention relates to radiant energy analyzers and more particularly to dual source, common path radiant energy analyzers.

In the field of radiant energy analyzers, it has been the general practice to provide an optical system in which measurement of the absorption from a radiant energy beam has been performed by comparison of the attenuated beam with a reference beam, an instrument configuration known to one skilled in the art as a double-beam analyzer. Two well-known embodiments of the double-beam analyzer commonly utilized have been the double-beam-in-space and the double-beam-in-time instruments, the former having an optical system in which the reference beam does not traverse the sample cell and the latter having an optical system in which both the sample and reference beams traverse the sample cell.

The dual-beam-in-space instrument had one radiant energy path into which the sample or substance for analysis was placed with a detector at the end of the path to generate a signal in response to the energy traversing the path. A reference path was provided and the energy from the reference path was commonly adjusted to equal that from the sample path in the absence of a sample. By means of rotating mirrors and beam interupting shutters the radiant energy was alternately directed to the detector from the sample and reference paths respectively. Therefore, when there was no sample present in the sample path, the energy received by the detector from either path was identical and no signal was generated by the detector. Upon the presence of an absorbing substance in the sample path, less energy reached the detector from the sample path and the detector became unbalanced and generated a signal proportional to the difference in energy received from the reference and sample paths.

It was common practice in the above described dual-path-in-space instrument to use a common source of energy with beam splitting or rotating mirror devices to alternately direct the radiation along one path and then the other or to use dual sources which were reasonably matched in spectral and level radiant energy level characteristics and to alternately permit the radiation therefrom to traverse the respective paths. Spectrally selective sources having particular lines or regions of emission in the radiant energy spectrum have been utilized to sensitize the instrument to substances having absorption at these spectral lines or regions.

Another practice in connection with the above dual-path-in-space instrument was to use selective and non-selective detectors. Detectors such as thermistors, thermocouples, thermopiles, bolometers and semiconductor cells have been used widely as non-selective detectors with sensitivities to a broad spectrum of radiant energy. By a method known as negative filtering, sensitizing cells or filters were placed in front of these non-selective detectors to make them selective to the substances which were aborbant in the spectrum regions attenuated by the filtering. Selective detectors such as pneumatic, acoustic or microphonic type detectors were employed, having a built in selectivity provided by the inherent absorption characteristic of a gaseous substance contained within the detector. When such a selective detector was irradiated with radiant energy, it was only sensitive to that portion of the energy spectrum in which the gaseous substance contained therein absorbed. The energy absorbed caused the gaseous substance to move a diaphragm which in turn was used to provide an indication of the incident energy received by the detector in the spectrum of the gaseous substance.

Although the dual-path-in-space instruments have performed satisfactory, there are circumstance which have resulted in operating deficiencies. As a result of the dual paths, interfering substances having absorbtion characteristics overlapping those of the analyzed substances and appearing in different concentrations in each of the paths have generated interfering indications which degratde the selectivity and sensitivity of the instrument. In addition, dirt or other spectrally broad absorbing materials have accumulated upon the surfaces of optical elements common to one path and not to the other, again resulting in an interfering indication. Another difficulty has occurred if dual detectors were used, the problem being the matching of detectors to generate identical indications to interferents. A similar problem has been the matching of radiant energy sources. Where single detectors and sources have been used, it has been necessary to provide rotating mirrors to alternately reflect radiant energy from one and then the other of the two paths. The mechanical rotating parts have proved undesirable because of their size and difficulties of synchronization in respect to other moving parts and in respect to electrical synchronous detection methods well known to the art. The use of non-mechanical optical beam splitting devices has resulted in undesirable losses of energy and in problems of dirt accumulation on uncommon optical surfaces discussed hereinabove.

To overcome these problems, the double-beam-in-time or single path, dual wavelength instrument was developed. Several embodiments of this type of instrument have been utilized. For example, a source having a broad radiation spectrum has been modulated by a rotating filter disk which alternately passed radiation from the source in first and second spectrum regions, respectively, through a sample cell containing a substance for analysis and then to a non-selective detector. The rotating filter has also been placed between the sample cell and the detector to make the detector selective to the first and second spectrum regions of the filter. Another configuration utilized dual sources which were continuously radiating in first and second spectrum regions, respectively, and which were alternately directed by means of a rotating mirror through the sample cell to the detector. A still further configuration incorporated a selective pneumatic detector having two sections in tandem, each being sensitized to different spectrum regions or to the same region but having different spectrum widths, and a source having a broad emitting spectrum which was either mechanically interrupted or chopped or was electrically operated in a pulsating manner. Both sections of the tandem pneumatic detector received energy from the source over the same identical path. The first section acted as a filter for the second section thereby permitting the use of the same gaseous charging substance to be used in both sections, the first section being sensitive to the center of the spectrum region of absorption and the second section being sensitive to the spectrum edges of the region of absorption.

Although the embodiments of the dual-path-in-time instrument have performed satisfactory in most cases, they have exhibited problems in various operating conditions in that the mechanical rotating or reciprocating parts such as filter wheels and mirrors were subject to mechanical failure, misalignment and degredation in performance from dirt and other substances. Although the single electrically operated source and selective detector performed in an acceptable manner under most conditions, it was difficult to make a selective detector having the same optical view of the sample container for the various spectrum regions of selectivity to which it was sensitized. This resulted in erroneous responses to mixtures of gaseous substances which were not uniformly distributed throughout the sample container. Moreover, the tandem pneumatic detector which had the same optical view of the sample container, was difficult to construct, having two separate detector sections, and the response was critically dependent upon the relative charging of the sections and their ability to hold their respective charges.

Those concerned with the development of radiant energy analyzers have long recognized the need for a simple analyzer configuration which overcomes the problems and difficulties set forth hereinabove. The present invention fulfills this need.

One of the most critical problems confronting designers of dual-path-in-time radiant energy analyzers of the type having no mechanical moving parts and having a detector with one spectrum region of sensitivity has been the fabrication of a source capable of providing a reference spectrum and an analytical or sample spectrum of radiant energy which can be alternately activated to irradiate a sample or substance to be analyzed. This problem is overcome by the present invention.

The general purpose of this invention is to provide a radiant energy analyzer which embraces all the advantages of similarly employed dual-path-in-space and dual-path-in-time radiant energy analyzers and possesses none of the aforedescribed disadvantages. To attain this, the present invention contemplates a unique electrically operated dual source arrangement whereby mechanical moving parts are avoided and alternate analytical and reference radiant energy spectrums are produced whereby the requirement of selective detectors having both analytical and reference spectrums of sensitivity are avoided.

An object of the present invention is to provide a source of radiant energy from which two spectral regions of radiant energy alternately are emitted.

A further object of the invention is the provision of a dual-path-in-time radiant energy analyzer having no moving parts and which utilizes radiant energy alternating between first and second spectrum regions.

Another object is the provision of two energy spectrums in a radiant energy analyzer which alternately irradiate a sample cell containing a substance to be analyzed.

Still another object of the present invention is the provision of a pair of tandem sources of radiant energy, the radiant energy of one source being incident upon and transmitted substantially through the other.

Yet another object is the provision of a pair of tandem sources having different spectral regions of emission, the spectrum of one source being transmitted through the other source.

A still further object of the present invention is the provision of a first broad spectrum of modulated radiant energy which is transmitted through a filter having a narrow spectrum band of rejection or absorption and then through a source of a second broad spectrum of radiant energy which is modulated in synchronism with the first broad spectrum.

Yet another object is the provision of a primary source generating a first radiant energy spectrum which is transmitted through a substance to be analyzed, the radiant energy transmitted thereby being incident on a secondary source which in turn transmits the radiant energy to a detector, the secondary source being a reference source of radiant energy which is alternately activated in synchronism with the primary source to establish analytical and reference radiant energy which conditions are maintained in balance by a feedback connection from the detector to at least one of the sources.

Other objects and many of the attendant advantages of this investion will be readily appreciated as the same becomes better understood by reference to the following detailed description when considered in connection with the accompanying drawings in which like reference numerals designate like parts throughout the figures thereof and wherein:

FIG. 1 (a), (b), (c), (d), (e), (f) and (g) illustrated in block diagram form various combinations of dual source configurations in radiant energy analyzers as examples of embodiments of the present invention;

FIG. 2 shows a cross-section view of a preferred radiant energy analyzer emodiment of the present invention;

FIG. 3 (a) and (b) are graphical presentations of the spectrum intensity of the radiant energy at various points in the radiant energy analyzer of FIG. 2 and FIG. 3 (c) is a graphical presentation of the spectrum response of the analyzer as referenced to the two sources of radiant energy; and FIG. 4 is a system block diagram of a radiant energy analyzer emobidment of the invention.

Referring now to the drawings, there is illustrated in FIG. 1 (a) through FIG. 1 (g) a series of radiant energy analyzer configurations which embody the dual source arrangement contemplated by this invention. FIG. 1 (a) shows primary source 5, Sp, connected to sample container 9 which in turn is attached to secondary source 7, Ss, which is connected to detector 10. FIG. 1 (b) illustrates a configuration similar to FIG. 1 (a) but having filter 11 interposed between primary source 5 and sample container 9.

FIG. 1 (c) shows an arrangement similar to FIG. 1 (b) but with the secondary source 7 interchanged with sample container 9 in the sequence of positions. FIG. 1 (d) is similar to FIG. 1 (c) but with a second filter 13 interposed between secondary source 7 and sample container 9. FIG. 1 (e) is similar to FIG. 1 (c) but with filter 11 removed and with primary source 5 juxtaposed secondary source 7. FIG. 1 (f) illustrates a configuration wherein the primary source and secondary source are combined into one unit 15 and otherwise is substantially the same as FIG. 1 (e). FIG. 1 (g) departs from the tandem configuration illustrated in the other figures of FIG. 1 in that primary source 5 with filter 11 and secondary source 7 with filter 13 are connected to the arms of an optical combining element 8 which in turn is connected to sample container 9 to which detector 10 is attached.

FIG. 2 shows a section view of a preferred embodiment of the invention. Primary source 5 contains energy radiating element 17 which is extended through insulating seals 19 in the body of source 5 whereby electrical power may be applied to activate the element. Window 23 seals the chamber of source 5 allowing a gaseous substance to be contained therein to enhance the radiating performance of the element 17. Filter 11 is attached to source 5 and sealed thereto by O ring 21. Secondary source 7 containing energy radiating element 29 which penetrates through the body of source 7 through insulating seals 31 is connected to filter 11 and sealed thereto by O ring 27. Window 25 is attached to source 7 and forms a chamber within filter 11 bounded on the other side by window 23 into which chamber gaseous substances of various spectrum absorbing characteristics may be inserted and contained to obtain a desired filter characteristic. Window 33 is attached to the other side of source 7 and completes the chamber of source 7 allowing a gaseous substance to be contained therein to enhance the desired radiating characteristics of element 29. It should also be noted that windows 23 and 27 may be omitted and the entire chamber between window 33 and the body of source 5 may be used to contain a gaseous substance to filter the energy from source 5 and substantially leave source 7 unaffected.

Attached to the above tendem combination of source 5, filter 11 and source 7 is sample cell 9, O ring 35 seals sample cell 9 to the tandem combination.

Sample cell 9 is connected to detector 10, the connection being sealed by O ring 41. Window 43 closes one end of detector 10 and also forms the other end of sample cell 9 to complete a chamber therein for containing a gaseous substance for analysis.

The body of detector 10 is formed by concentric cylinders 45 and 47 which are attached at one end to window 43. Inner cylinder 45 has the other end thereof sealed by a flexible diaphragm 49. Conductive ring 51 is attached to the circumference of the other side of diaphragm 49 sandwiching the diaphragm between cylinder 45 and ring 51. Ring 51 provides means to which an electrical connection is attached which connection is extended through outer cylinder 47. Outer cylinder 47 is sealed on one end by window 43 and on the other end by disk 55 to which electrode 53 is attached. An electrical connection is extended from electrode 53 through disk 55. The volume within the cylinder is charged with a radiant energy absorbing gaseous substance to sensitize the detector to a particular spectrum region.

FIG. 3 (a), (b) and (c) illustrate the spectrum characteristics of the radiant energy intensity and response of the analyzer illustrated in FIG. 2. FIG. 3 (a) shows the radiant energy characteristics of primary and secondary sources 5 and 7. FIG. 3 (b) shows the radiant energy spectrum from primary source 5 after being transmitted through filter 11 illustrating the affect of filter 11 on the radiant energy spectrum. Finally, FIG. 3 (c) graphically displays the response of the analyzer to the spectrum of primary source 5 and to the spectrum of secondary source 7.

FIG. 4 sets forth a block diagram schematic of an analyzer system embodying the radiant energy analyzer illustrated in FIG. 2. Clock 18 is electrically connected to and activates modulators 12. Modulators 12 are electrically connected to and activate primary and secondary sources 5 and 7 by alternately connecting power supplies 20 and 22 thereto respectively. Detector 10 is electrically connected to the input of synchronous detector or demodulator 14 which is in turn electrically connected to and activated by Clock 18. The output of demodulator 14 is electrically connected to power supply 22 to vary the power supplied to source 7 in accord with the output. Display 16 is electrically connected to the output of power supply 22 and indicates variations in power therefrom.

Operation of the present invention can best be described by reference to FIGS. 2 and 3. Element 17 of source 5 in FIG. 2 is made to radiate energy by heating the element from a source of energy such as the application of electrical power to element 17. The inside of the enclosure surrounding element 17 may be made reflective to enhance the efficiency of source 5. A gaseous substance may be placed in the enclosure to aid emission at particular spectrum regions or to absorb radiant energy undesired at other regions in the radiant energy spectrum. FIG. 3 (a) shows the typical spectrum distribution of the energy emitted by primary source 5. Source 5 is modulated by alternately applying and removing electrical power thereby causing the radiant energy to fluctuate accordingly.

The radiant energy leaving source 5 passes through filter 11 which may be a solid optical element of the refractive and reflective interference type well known to the art of radiant energy analyzers or be formed, as illustrated in FIG. 2, by an absorbing gaseous substance confined within an enclosure which is traversed by the radiant energy. The windows 23 and 25, if not omitted, may also be filters of the band "cut-off" or "cut-on" type well known to the art to further eliminate unwanted portions of the radiant energy spectrum. The spectrum of the radiant energy after traversing filter 11 is illustrated in FIG. 3 (b), the filter eliminating a portion of the radiant energy spectrum. The transmission characteristic of the filter is designed to match the absorption characteristic of the substance being analyzed such that the filter substantially eliminates energy in the center of the spectrum region of absorption by the substance. This filtered spectrum is then passed through source 7, sample container 9 and detected in detector 10. Therefore, the relative changes in concentration within sample container 9 of the substance being analyzed substantially will not alter the radiant energy received by detector 10 from source 5.

However, source 7 has no filter except for windows 33 and 43, and the radiant energy emitted in the spectrum region of absorption is transmitted through sample container 9 and into detector 10 in relation to the concentration of the substance being analyzed. Therefore, the radiant energy spectrum reaching detector 10 from source 7 substantially is affected by varying concentrations of the substance being analyzed.

The detector response or the spectral responsivity to the radiant energy spectra received from the two sources is illustrated in FIG. 3 (d). The response to the primary source 5 plus filter 11 is graphically set out as the solid line and the response to the spectrum of the secondary source is represented by the dashed line.

Sources 5 and 7 are electrically operated in synchronism such that when source 5 is activated and radiating, source 7 is not and when source 7 is activated, source 5 is not. Consequently, as shown in FIG. 3 (c), detector 10 is responsive to a spectrum from source 5 which has substantially no energy in the spectrum region of interest, namely, the absorption band of the substance being analyzed, and therefore establishes a reference condition substantially unaffected by variations in the concentrations of the substance being analyzed. On the other hand, when source 7 is activated, the spectrum of radiant energy received by detector 10 is substantially affected by varying concentrations of the substance being analyzed and therefore provides a measurement or sample condition of analysis.

It now should be clear that filter 11 has a characteristic which substantially matches the absorption characteristic of the substance being analyzed in order to provide the reference spectrum described above. To obtain this characteristic, the filter may be charged with the same gaseous substance being analyzed or with other substances having identical or similar absorption characteristics in the spectrum region of interest. To extend the dimensions and effect of filter 11, windows 23 and 25 may be omitted and the entire chamber between window 33 and the body of source 5 may be charged with the appropriate gaseous substances. Narrow band reflective and refractive filters well known to the field of optical filtering may be used such as multi-layered coated substrates.

The substance being analyzed is passed in a gaseous or vapor form into and out of sample container 9 through tubes 37 and 39. The absorption of the radiant energy in the region of interest is generally proportional to the concentration of the substance under investigation.

Detector 10 is illustrated in FIG. 2 as pneumatic detector or a "microphone" detector which is charged with at least one gaseous substance having an absorption characteristic identical or similar to the substance being analyzed. Although a more broad spectrum of sensitivity may be used, a narrow spectrum of sensitivity increases the response of the detector to the substance being analyzed and reduces the response to other interfering substances having adjacent absorption spectra. Therefore, the response of the detector to the radiant energy spectra from the primary and secondary sources is graphically displayed in FIG. 3 (c) for the case of a pneumatic detector, charged with the substances being analyzed.

The gaseous charge within detector 10 absorbs the energy in the narrow band of its absorption characteristic. This absorbed energy causes the gaseous substance to move diaphragm 49 toward electrode 53, much like the plates of a capacitor being moved closer together. By suitable electronic means, well known to the field of radiant energy analyzers and electrical measurement, the change in capacitance produced by this motion is converted to an electrical signal. If the radiant energy being received during the reference condition and the radiant energy received during the measurement or sample condition in the absence of the substance being analyzed are adjusted in intensity to produce the same effect on the detector, then substantially no signal will be generated by the detector and associated electronics as sources 5 and 7 are alternately activated. This is known as a balanced condition of operation or the instrument "zero" indication condition.

When the substance to be analyzed is placed within sample container 9, the radiant energy received by the detector under reference condition is substantially unaltered and the energy under the measurement or sample condition is reduced by an amount proportional to the concentration of substance. Therefore, the balance is altered and a signal proportional to the unbalance is produced and displayed.

It should be noted that a multi-component analyzer can be formed by including in the gaseous charge within the detector the various components or constituents desired, such as; for example, gases A, B, C, and D. To sensitize the analyzer to gas A, filter 11 is charged with gas A. To change the sensitivity of the analyzer to gas B, gas A is removed from filter 11 and replaced by gas B, and similarly for gases C and D.

FIG. 4 illustrates a block diagram of a radiant energy instrument which incorporates the above described components and operation. In response to clock 18, modulators 12 alternately apply power from power supplies 20 and 22 to activate sources 5 and 7, respectively. The unbalance signal generated by detector 10 is in the form of an alternating electrical signal and is applied to synchronous detector 14 of the type widely used and well known in the art of electrical detection for radiant energy analyzers. Synchronous detector 14 is operated by clock 18 in synchronism with modulators 12 such that only selected signals of the same alternating frequencies as that produced by the clock and having a predetermined phase relation thereto are detected and transformed into a dc signal proportional in magnitude to the selected signals. This type of detection helps to overcome electrical interference which is troublesome to the low-level electrical signals which may be present a reduced levels of concentration of the substance being analyzed. The output of synchronous detector 14 is connected to power supply 22 to vary the power applied to source 7 through the modulator. This control connection forms a feedback loop to maintain the balance signal condition from detector 18. Under conditions of high loop gain, the feedback reduces the output signals of detector 18 to substantially zero. Display 16 is connected to power supply 22 to indicate variations in the voltage or currents produced in response to the feedback controls to maintain the balance signal near zero magnitude. Display 16 may be an analog or digital meter or any other suitable means of displaying concentration of the analyzed substance.

To illustrate the feedback control, consider a gas to be detected present in the sample cell. Therefore radiant energy from source 7 reaching detector 10 will be reduced in proportion to radiant energy from source 5 producing an unbalance signal from detector 10. This signal in turn changes the power output from power supply 22 to increase the radiant energy from source 7 thereby tending to bring detector 10 back into balance and release the signal output therefrom toward zero. The change in power output from power supply 22 may be in the form of an increase in voltage or current whereby the power to source 7 is increased and in turn the energy which is radiated therefrom. Display 16 indicates the voltage or current change which is displayed as a measure of the quantity or concentration of the gas being detected.

Although a particular embodiment of the present invention is set forth in FIGS. 2 and 4, other combinations and configurations of the type illustrated in FIG. 1 but not limited thereto, are contemplated within the scope of this invention.

For example, FIG. 1(a) shows the sample container located between the sources whereby secondary source 7 now acts as a reference source of energy and does not pass through the sample container. Therefore, no filter is required to separate the reference and sample regions of the spectrum. However, since secondary source 7 does not radiate through sample container 9, variations in background absorption of radiation from primary source 5 and absorption by interferents in sample container 9 will produce false signals and corresponding indications. Nevertheless, the simplicity and low cost make this configuration of interest.

In FIG. 1(b) a filter is added in combination with primary source 5 to narrow the radiant energy band of emission for the purpose of overcoming the effects of background and interferents described above.

FIG. 1(c) is essentially the same configuration as described in connection with FIGS. 2 and 4.

In FIG. 1(d) a second filter 13 is added in association with secondary source 7. This filter preferably is constructed from solid optical materials which cover or obscure the radiating elements of source 7 but allow the radiant energy from primary source 5 to pass unfiltered. A structure accommodating such a feature, not illustrated in the drawings, is fabricated by using parallel radiating elements mounted adjacent to strips of filter material, the filter being placed between the element and the sample container. These elements and associated filters are coplanar and are spaced to allow the passage between them of radiant energy from the primary source. Another possibility is to fabricate a secondary source having the elements thereof treated in such a manner or constructed of such materials as to provide radiant energy in a predetermined desired spectrum region. Although these particular methods or techniques are set forth to illustrate the source-filter configurations associated with FIG. 1(d), other configurations are possible and may be utilized within the scope of the present invention.

FIG. 1(e) contemplates the use of specific radiating sources of the type such as those made of materials and coatings which radiate in particular spectrum regions, gaseous and solid state lasers and other sources of similar limited or discrete spectral emissions. Sources 5 and 7 then may be employed without further filtering to provide sample and reference spectra to be utilized as described before in connection with FIG. 2.

FIG. 1(f) incorporates the sources in one structure. Such a combination may be achieved by alternately interspacing a radiating element of primary source 5 between radiating elements of secondary source 7. Again, filter strips may be associated with each element to obtain a desired radiating spectrum. As before, the elements of source 5 are alternately activated with the elements of source 7.

Finally, FIG. 1(g) illustrates a configuration in which the secondary source 7 is not required to transmit the energy received from the primary source 5. An optical combining network 8, which may comprise two intersecting guides or tubes through which radiation is directed by what is known in the art as "tunnel optics," guides the radiation from each source into sample container 9. Intersecting prisms, transmitting the radiant energy from the sources to the sample container, may also be used, the plane of intersection containing the axis of the sample container.

It now should be apparent that the present invention absorption provides dual sources of radiant energy which may be employed in conjunction with a radiant energy analyzer for providing alternate reference and sample energy spectra for transmission through a sample container to a single channel detector sensitized to one spectrum region coincident with the absorption spectrum of the substance to be analyzed.

Although particular components, etc., have been discussed in connection with a specific embodiment of an analyzer constructed in accordance with the teachings of the present invention, others may be utilized. Furthermore, it will be understood that although an exemplary embodiment of the present invention has been disclosed and discussed, other application and component arrangements are possible and that the embodiments disclosed may be subjected to various changes, modifications and substitutions without necessarily departing from the spirit of the invention.

What is claimed is:

1. A radiant energy analyzer comprising:
   primary and secondary sources of radiant energy, the secondary source substantially being transmissive to radiant energy which may be directed thereto;
   container means interposed between said primary and secondary sources for confining a radiant energy absorbing substance, radiant energy from the primary source being directed through said container means to said secondary source;
   modulating means coupled to said primary and secondary sources for varying the radiant energy therefrom; and
   detector means adjacent said secondary source for receiving and indicating the difference between the radiant energy transmitted through said container means and said secondary source from said primary source and the radiant energy from said secondary source.

2. The radiant energy analyzer described in claim 1, further comprising sample cell means interposed between said secondary source and said detector means for containing a substance to be analyzed, both the radiant energy transmitted through said container means and said secondary source from said primary source and radiant energy from said secondary source being directed through said sample cell means to said detector means, said container means and radiant energy absorbing substance confined therein being utilized as a radiant energy filter.

3. The radiant energy analyzer described in claim 2 wherein said container means confines a gaseous radiant energy absorbing substance substantially having the same spectral absorbing characteristics as the sample substance being analyzed.

4. The radiant energy described in claim 2 wherein said container means is replaced by solid optical filter means.

5. The radiant energy analyzer described in claim 4 wherein said solid optical filter means has a spectral transmission characteristic substantially similar to the spectral transmission characteristic of the substance being analyzed.

6. The radiant energy analyzer described in claim 3 wherein said detector means is a selective detector having a spectral responsivity substantially similar to the absorption characteristic of the substance being analyzed.

7. A radiant energy analyzer comprising:
sample cell means having a volume for containing a substance to be analyzed, said volume having a single path therethrough which is transmissive to radiant energy and said substance having a characteristic radiant energy absorption spectrum;
a primary source of radiant energy having a radiant energy emission spectrum with substantially no emission in said absorption spectrum regions of said substance to be analyzed;
a secondary source of radiant energy having a radiant energy emission spectrum which coincides with at least part of said absorption spectrum of said substance to be analyzed;
means for alternately directing radiant energy from said primary and secondary sources to said sample cell means and over said single path;
detector means for receiving and indicating the difference in radiant energy received from said primary and secondary sources alternately transmitted over said single path, said detector means being spectrally responsive to the radiant energy spectrum of said primary and secondary sources.

8. The radiant energy analyzer described in Claim 7 wherein said primary and secondary sources are electrically powered sources connected in tandem, said secondary source being transmissive to radiant energy from said primary source and wherein said sample cell is connected to said secondary source to receive radiant energy from both said primary and secondary sources.

9. The radiant energy analyzer described in claim 8 wherein said means for alternately directing radiant energy to said sample cell means comprises:

first power supply means for supplying power to said primary source;
second power supply means for supplying power to said secondary source; said second power supply means being connected to said detector means and being controlled by said detector means to balance the radiant energy received by said detector means from said primary and secondary sources;
first and second modulator means connected between said primary source and said first power supply means and said secondary source and said second power supply means, respectively, for alternate applying power from said first and second power supplies to said primary and secondary sources; and
clock means connected to said first and second modulator means to synchronize the alternate application of power to said sources by said modulator means.

10. In a radiant energy analyzer of the type having a primary source, a sample cell and a detector connected in tandem and means for modulating the source and directing the radiant energy therefrom through the sample cell, the improvement comprising:
a secondary source connected between the primary source and sample cell, said secondary source substantially transmitting to the sample cell substantially all of the radiant energy from the primary source, said secondary source being activated by the means for modulating to alternately provide to the sample cell radiant energy from the primary source and said secondary source, respectively.

* * * * *